United States Patent [19]
Johansson et al.

[11] 4,035,039
[45] July 12, 1977

[54] ROCK BIT ASSEMBLY

[75] Inventors: Carl Eric Johansson, Blaricum; Hans Bertil van Nederveen, Bosch en Duin; Hendrikus Jan Kapaan, Ijsselstein, all of Netherlands

[73] Assignee: SKF Industrial Trading and Development Company, B.V., Nieuwegein, Netherlands

[21] Appl. No.: 657,889

[22] Filed: Feb. 13, 1976

[30] Foreign Application Priority Data
Feb. 17, 1975 Netherlands .................. 7501815

[51] Int. Cl.² ........................ F16C 19/14
[52] U.S. Cl. ........................ 308/8.2
[58] Field of Search .................. 308/8.2

[56] References Cited
U.S. PATENT DOCUMENTS
3,572,853  3/1971  Coski .................. 308/8.2

Primary Examiner—Joseph F. Peters, Jr.
Assistant Examiner—Gene A. Church
Attorney, Agent, or Firm—Daniel M. Rosen

[57] ABSTRACT

Rock bit assembly comprising a rock bit for drilling holes in the earth's crust mainly consisting of an integral bit body which can be connected to a drive shaft, a number of rotatable cutter cones which, by means of a rolling bearing arrangement, is rotatably connected to said bit body, each of said cutter cones comprising a central shaft or pin forming a part of said rolling bearing arrangement, wherein a cutter cone and bearing arrangement form a unit which is disengageably secured to said bit body by means of the outer race ring of said bearing arrangement.

10 Claims, 2 Drawing Figures

ROCK BIT ASSEMBLY

Background of the Invention

The present invention relates to a rock bit assembly, and more particularly to a rack bit assembly for drilling holes in the earth's crust. Such assemblies includes an integral bit body connected to a drive shaft, and a number of rotatable cutter cones being rotatally connected to said bit body by means of a rolling bearing arrangement. Each of the cutter cones comprises a central shaft or pin forming a part of the rolling bearing arrangement.

A rock bit assembly of this type is described in U.S. Pat. No. 3.307.645 to Hildebrandt. During a long period it was considered that the lifetime of the cone was the determining factor in the relatively short service-life of this type of rock bits. However, since the introduction of hard-metal-inserts in cutter cones, the service-life is determined by the failure of the bearing arrangement. This problem is partly solved by sealing the bearing in an enclosed space, however, the cause of failure of the bearing may be from a number of other factors, most important of which is the fact that the geometry of known rock bits is such that they cannot be pressed or cast as one piece but only constructed by welding together of at least two pre-fabricated components. This, however, is not conducive to producing the accuracy necessary to obtain a correct sealing.

It is therefore of object of the invention to provide a novel and unique construction permitting improvement in the mounting and dismounting of cutter cones to the bit body as a result of such a construction a more evenly load distribution is achieved among the cones, leading to an increased efficiency of the rock bit's performance. This means, that for example mounting of the cones now can be achieved without disintegrating the bit body. Furthermore, this arrangement enables a used but reliable bit body to be provided with cutter cones according to the invention. Therefore, a cutter cone and bearing arrangement now may form a unit which is disengageabley secured to the integral bit body by means of the outer race ring of said bearing arrangement. Furthermore each of the cone and bearing units can be easily pushed along each other and along a side of the connecting leg of said bit body.

The U.S. Pat. No. 3.550.972 to Coski discloses a rock bit assembly comprising a disengageable cutter cone and bearing unit. However, the connection of these units to the bit body as well as the bearing arrangements are completely different from that employed by the present invention. Further, the cutter cone itself does not comprise the central bearing shaft or bearing pin and these features, as mentioned before, are necessary to improve the stiffness of the unit as well as its reliability and simple construction design.

Summary of the Invention

The foregoing objects and advantages are realized in accordance with the invention by a construction which allows savings both in manufacturing costs and a more accurate positioning of the cutting cones this construction is manifest in the embodiment according to which the inner side of the outer bearing ring forms the race ways for a double row of rolling elements, the outer side forming a part of a sealing for said bearing arrangement.

A feature of this invention by means of which the bearing life is increased comprises a rock bit assembly having a relatively long slit-like space between the inner side of the cutter cone and the bit body, this space comprising a sealing means and being positioned between the inner side of the cutter cone and the outer side of the bearing outer ring. The sealing means is applied at the largest distance from the engaging part between the outer ring and bit body, close to the row of rolling element which is situated innermost said cutter cone.

Another feature of the rock bit assembly according to the invention comprises a space which contains a lubricant, this space being limited by the sealing means and inner side of the bit body which closely joins the end part of the central shaft or bearing pin and being provided with a flexible member, such as a membrane, which can act upon the lubricant, the membrane being situated between the bearing pin and inner side of the bit body.

According to a preferable embodiment, the central shaft or bearing pin, after machining is joined to the cutter cone.

BRIEF DESCRIPTION OF THE DRAWINGS

In order that the invention may be readily understood and further features made apparent, a rock bit assembly according to the invention will now be described, by way of example, with reference to the accompanying drawings in which.

DETAILED DESCRIPTION OF THE PREFERRED EMBODIMENT

Figure 1:
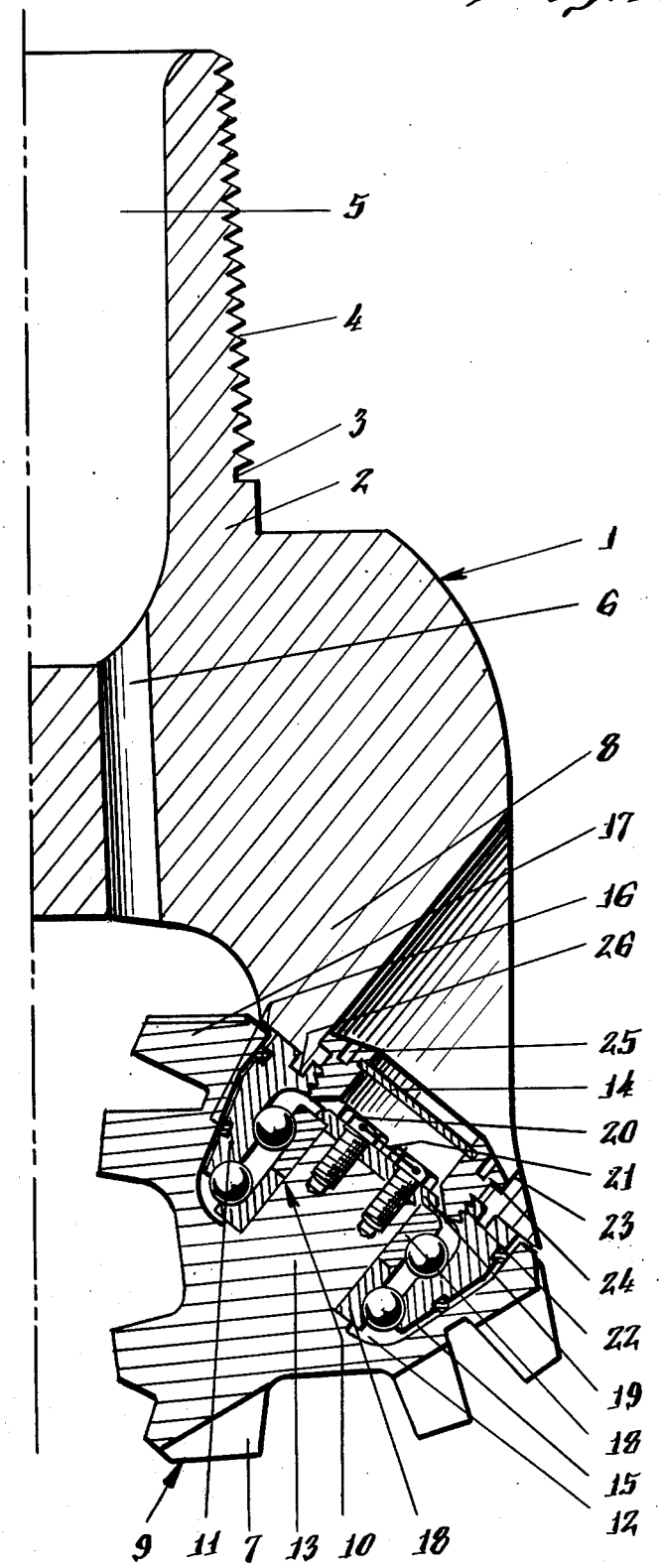
FIG. 1 is a half elevation, partly a sectional view, of a first embodiment of the invention.

According to FIG. 1, the rock bit 1 comprises an integral body 2 provided with an upper sleeve 3 fitted with a thread 4. The sleeve and the thread form a standardised tool joint for securing the bit to the bottom of a rotary drilling string or drive shaft (not illustrated). A channel 5 runs through the body from the opening in the top of the sleeve to nozzles 6 for injecting the drilling fluid under the bit. Usually there are two or more of these nozzles and these are directed in such a way that they carry the fluid to the formation between the cutter cones 7. A number of legs 8 (of which only one is illustrated in the drawing) are placed on the circumference of the body 2 and sufficiently spaced to allow the cutter units 9 to be fitted. These units comprise mainly a cone 7, a bearing assembly 10, and a section of the leg part 11 shaped to create an enclosed space 12 within the unit 9 and enabling the unit to be secured to the integral body 2 in an easy and reliable way.

This might be called a reversed rock bit, because in most cases the cutter cones rotate around pins 13 that form part of the legs 8 and on which the inner races 18 of the bearing assembly 10 are mounted. Mainly due to these bearing pins, manufacturing of a bit body 2 of one piece was not possible and for this reason this body is usually structured of two or more sections, preferably joined by welding.

In contrast to these known rock bits a separate part 11 of each leg 8 now forms the outer race of the bearing assembly 10, and each unit 9 comprises an integral center pin 13 to which the inner races 18 of the bearing assembly are fitted. The closed space 12 is limited on one side of the bearing by a flexible component such as a membrane 14 and on the other side by a comparatively long and narrow gap 15 between bearing part 11 of leg 8, which forms the outer race of the bearing assembly 10, and the inside of cone 7. The gap functions as a seal and extra sealing elements 16 such as O-rings, lip-shaped seals, labyrinth seals, spiral groove seals, brushes or similar frictional seals, or restrictive passages can be applied. The gap with the sealing effect, which for about half its length lays almost parallel to the center-line of pin 13 and membrane 14, ensures that a lubricant is contained in the enclosing space 12 thus avoiding ingress of drilling fluid in bearing 10. According to this embodiment the side of the membrane 14 facing away from the lubricant is subjected to the drilling fluid pressure that is present in the area where the drilling fluid has left the drilling surface.

The cutter cone 7 is provided with external teeth 17, hard alloy pins or similar projections for crushing the formation at the bottom of the well. The bearing assembly further comprises double-row angular contact ball bearings with a split inner race. However, other types of bearings such as taper, conical or similar rolling bearings and/or plain bearings can be applied. The bearing assembly is set under axial prestress by a ring 19 pressing against the inner race ring of the bearing 10 with the aid of bolts 20 screwed into the bearing pin 13. If more than one bolt is used, the bolts 20 can be locked by means of lock wire 21 through holes drilled in the bolt heads.

In this embodiment the units 9 may be secured to the leg 8 by inserting a bush 23 having a flange 24 containing the membrane 14, and a thread 22, into a shouldered bore of leg 8, and screwing this bush tightly into the correspondingly threaded section 11 of leg 8 by using a special tool that engages in the recesses 25. This fastening in fact forms a part of the outer race of the bearing. To be able to center the unit accordingly and thus ensuring a proper gap 15, a raised annular rim 26 on the leg 8 engages in a corresponding recess of part 11 of the leg which forms part of the unit. To counteract rotation, a centering pin (not illustrated) may also be fitted.

Figure 2:
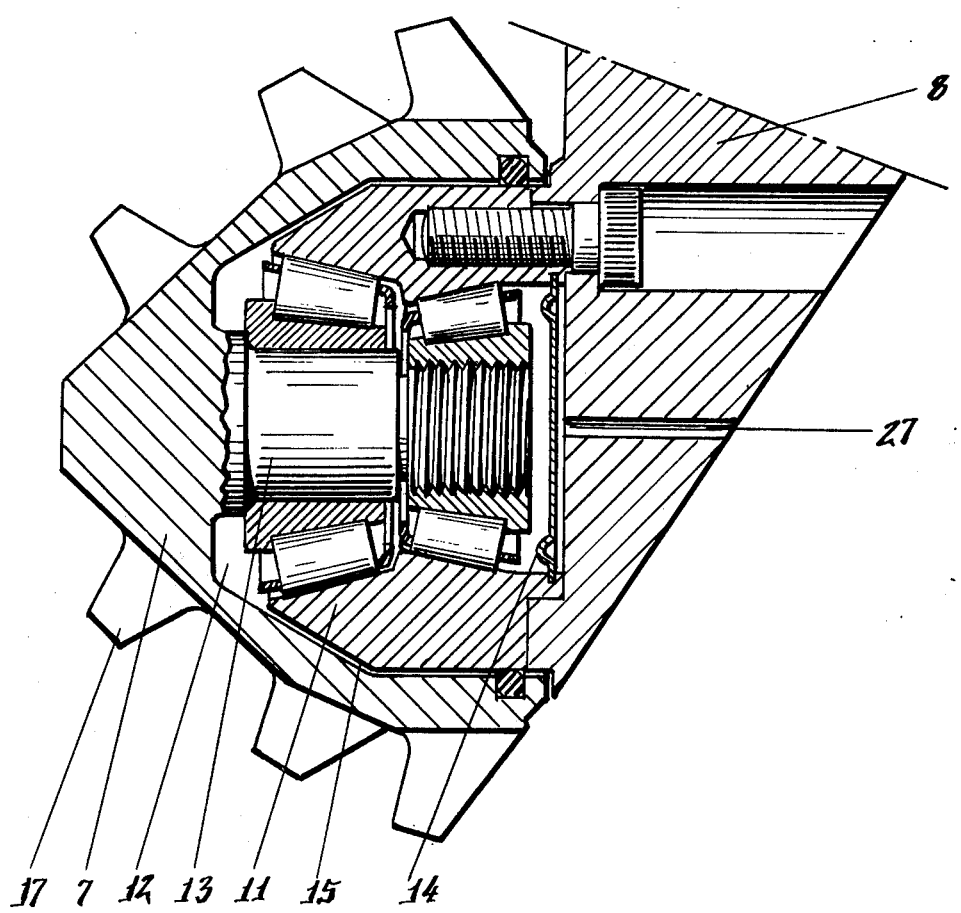
FIG. 2 is a sectional view of an assembly according to another embodiment.

In FIG. 2 another embodiment according to the invention is shown; parts corresponding to the embodiment of FIG. 1 have retained the same reference numbers. The enclosed space 12 is limited on one side by a flexible component such as a membrane 14 and on the other side by a relatively long and narrow gap 15 between the outer race ring 11, which is immovable relative to the conical cutter 7, and its inside. The gap 15, with its sealing effect and for about half its length being parallel to the center-line of pin 13, together with the membrane 14, ensure that the lubricant is contained in the enclosed space 12 and is prevented from ingress of drilling fluid. In this embodiment, the side of the membrane 14 facing way from the lubricant is subjected to the drilling fluid pressure that is present in the drilling string because of the channel 27 drilled through the leg 8.

The conical cutter 7 comprises external teeth 17, hard alloy pins or similar projections for drilling away the formation at the bottom of the well. The bearing arrangement is provided with an double-row taper roller bearing with a inner race ring mounted on pin 13.

This bearing assembly is set under an axial prestress by screwing one of the inner rings to the integral center pin 13. Further, according to a preferable embodiment, the center pin 13 which forms a part of the bearing arrangement and the conical cutter 7 itself can after machining the bearing pin 13 be joined together, as by welding. These measures contribute to the high requirements demanded for bearing arrangements of good quality.

It will be appreciated that within the scope of this invention many alternative embodiments are possible, in particular in relation to the connection of the cutter units to the legs of a rock bit. It is also possible to apply plain bearings or a combination of plain and rolling bearings.

We claim:

1. A rock bit assembly comprising, an integral drivable bit body, a cutter body including cutting means and having an extending central segment about which said cutting means are positioned, rolling bearing means including an inner race and an outer race, and rolling elements therebetween, means mounting one of said races to said cutter body extending central segment, and thereby forming an integral bearing unit and cutter body, means for disengageably mounting the other of said races to said drivable body, and means for sealing said rolling elements from the ingress of foreign material into the area of rolling contact in said rolling bearing means.

2. The rock bit assembly according to claim 1, wherein the inner side of said outer ring forms the raceways for a double row of rolling elements, and the outer side of said outer ring forms a part of said sealing for said bearing arrangement.

3. The rock bit assembly according to claim 1, having a slit-like space between the inner side of said cutter body and said bit body which space comprises a sealing means, wherein a relatively long slit-like space forming a seal is positioned between the inner side of said cutter body and the outer side of said bearing outer ring, another sealing means being applied at the largest distance from the engaging part between the outer ring and bit body close to the row of rolling elements which is situated innermost said cutter body.

4. The rock bit assembly according to claim 1, comprising a space which contains a lubricant, said space being limited by the sealing means and innerside of the bit body which closely joins the end part of said central segment, wherein a flexible member which can act upon the lubricant is situated between the bearing and the inner side of said bit body.

5. The rock bit assembly according to claim 1, wherein said central segment is joined to said cutter body.

6. The rock bit assembly according to claim 1, wherein centering means are provided between said outer race ring and said bit body to properly position said cutter body in relation to said bit body.

7. A rock bit assembly comprising a bit body including an extending segment, said bit body including means for coupling said bit body to a drive shaft, a cutter body including a plurality of cutting cones formed about a center pin, which is spaced from and extends upward relative to the interior of said cutter body, said center pin thereby extending from within a center space within said cutter body, a rolling bearing means including an inner race, an outer race, and a plurality of rolling elements operatively secured therebetween, means for securing said inner race to the periphery of said cutter body center pin at least partially interior of said center space, first means for sealing one side of said outer race along its exterior surface across the remaining space in said central space against the inner surface of said cutter body for preventing ingress of foreign material into one edge of said rolling bearing operating race area, second means for sealing the other side of said outer race for preventing ingress of foreign material into the other edge of said rolling bearing operating race area, and detachable means for mounting and demounting said cutter body and sealed bearing assembly from said extending segment of said bit body, said detachable means including first coupling means defined by said extending leg of said bit body and second coupling means defined by said outer race of said bearing means.

8. The rock bit assembly of claim 7, wherein said bit body includes a passageway opening at one end into communication with the drilling space and accommodating drilling fluid under pressure, and at the other end terminating at said second sealing means.

9. The rock bit assembly of claim 8, wherein said second sealing means is a membrane which extends across the said passage within a flanged body, said flanged body fitting within the passageway and threadably secured to a correspondingly threaded portion of said outer race.

10. The rock bit assembly of claim 8, wherein said second sealing means is a membrane which extends across an open area defined by said outer race and is secured directly about its periphery to said outer race.

* * * * *

UNITED STATES PATENT AND TRADEMARK OFFICE
CERTIFICATE OF CORRECTION

PATENT NO. : 4,035,039
DATED : July 12, 1977
INVENTOR(S) : CARL ERIC JOHANSSON et al It is certified that error appears in the above-identified patent and that said Letters Patent are hereby corrected as shown below:

Column 1, line 6 change "rack" to --rock--.

Column 1, line 7 change "includes" to --include--.

Column 1, line 9 change "rotatally" to --rotatably--.

Column 1, line 30 change "It is therefore of object of the invention" to --It is therefore the object of the present invention--.

Column 1, line 33 change "bit body as a " to --bit body. As a--.

Column 1, line 63 change "cutting cones this" to --cutter cones. This--.

Column 2, line 9 change "element" to --elements--.

Column 2, line 20 change "after machining is" to --after machining, is--.

Column 3, line 9 change "space 12 thus" to -- space 12, thus --.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks